United States Patent
Zhang et al.

(10) Patent No.: US 10,346,144 B2
(45) Date of Patent: Jul. 9, 2019

(54) METHODS AND APPARATUS TO MAP SINGLE STATIC ASSIGNMENT INSTRUCTIONS ONTO A DATA FLOW GRAPH IN A DATA FLOW ARCHITECTURE

(71) Applicant: Intel Corporation, Santa Clara, CA (US)

(72) Inventors: Yongzhi Zhang, Wayland, MA (US); Kent D. Glossop, Nashua, NH (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/721,454

(22) Filed: Sep. 29, 2017

(65) Prior Publication Data

US 2019/0102151 A1    Apr. 4, 2019

(51) Int. Cl.
*G06F 9/44* (2018.01)
*G06F 8/41* (2018.01)
*G06F 15/82* (2006.01)

(52) U.S. Cl.
CPC ............ *G06F 8/433* (2013.01); *G06F 8/4435* (2013.01); *G06F 15/825* (2013.01)

(58) Field of Classification Search
CPC .................................................... G06F 8/433
See application file for complete search history.

(56) References Cited

U.S. PATENT DOCUMENTS

| 4,833,606 | A | * | 5/1989 | Iwasawa | G06F 8/452 717/160 |
| 6,072,952 | A | * | 6/2000 | Janakiraman | G06F 8/433 717/155 |
| 2010/0023931 | A1 | * | 1/2010 | Cheng | G06F 8/433 717/156 |

OTHER PUBLICATIONS

Fleming, et al., "Configurable Spatial Accelerator: An Accelerator for High-Performance Computing," Intel Corporation, Dec. 20, 2016, 19 pages.

* cited by examiner

*Primary Examiner* — Hang Pan
(74) *Attorney, Agent, or Firm* — Hanley, Flight & Zimmerman, LLC

(57) ABSTRACT

Methods, apparatus, systems and articles of manufacture to map a set of instructions onto a data flow graph are disclosed herein. An example apparatus includes a variable handler to modify a variable in the set of instructions. The variable is used multiple times in the set of instructions and the set of instructions are in a static single assignment form. The apparatus also includes a PHI handler to replace a PHI instruction contained in the set of instructions with a set of control data flow instructions and a data flow graph generator to map the set of instructions modified by the variable handler and the PHI handler onto a data flow graph without transforming the instructions out of the static single assignment form.

25 Claims, 8 Drawing Sheets ions: 10,346,144 B2

METHODS AND APPARATUS TO MAP SINGLE STATIC ASSIGNMENT INSTRUCTIONS ONTO A DATA FLOW GRAPH IN A DATA FLOW ARCHITECTURE

GOVERNMENT INTEREST STATEMENT

This invention was made with government support under contract number H98230-13-D-0124 awarded by the Department of Defense. The government has certain rights in the invention.

FIELD OF THE DISCLOSURE

This disclosure relates generally to data flow architectures, and, more particularly, to methods and apparatus to map single static assignment instructions onto a data flow graph in a data flow architecture.

BACKGROUND

In recent years, a drive to increase processing speed in the arena of computing has led to increased interest in hardware accelerators. Hardware accelerators include units of hardware configured to perform specific computing functionality. The hardware units are linked together in a manner that allows a desired set of calculations to be performed on a data set. In many instances, the hardware units are linked in a manner that allows computationally intensive processing to be performed on multiple sets of data in parallel. The resulting concurrency can yield impressive processing speed that parallels and, in some instances, surpasses the processing speed achievable using general purpose processors that execute software instructions.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Hardware accelerators are frequently used to achieve high processing speeds that parallel and may even surpass the processing speeds achievable using general purpose processors that execute software instructions. Unlike general purpose processors, hardware accelerators employ a data flow architecture instead of a control flow architecture. As a result, the hardware accelerators (also referred to herein as data flow engines) are programmed using data flow graphs instead of conventional software instructions. Thus, conventional software instructions are converted to a data flow graph before they can be executed on a data flow engine.

A data flow graph includes a set of function units and channels connecting the function units. Each variable (in an equivalent software program) maps to a channel. A data flow graph is not used to represent software code that assigns more than a single value to a variable. As a result, a compiler configured to convert conventional software instructions to a data flow graph will first convert the software instructions into a form referred to as static single assignment (SSA). However, software in SSA form cannot be directly converted to a data flow graph. Thus, after converting the software to SSA form, a conventional compiler transforms the SSA formatted software out of the SSA form before the compiler generates a data flow graph for execution by the data flow engine. Unfortunately, methods used by compilers to transform software out of the SSA form are error prone and, for some special architectures, impossible.

Figure 1:
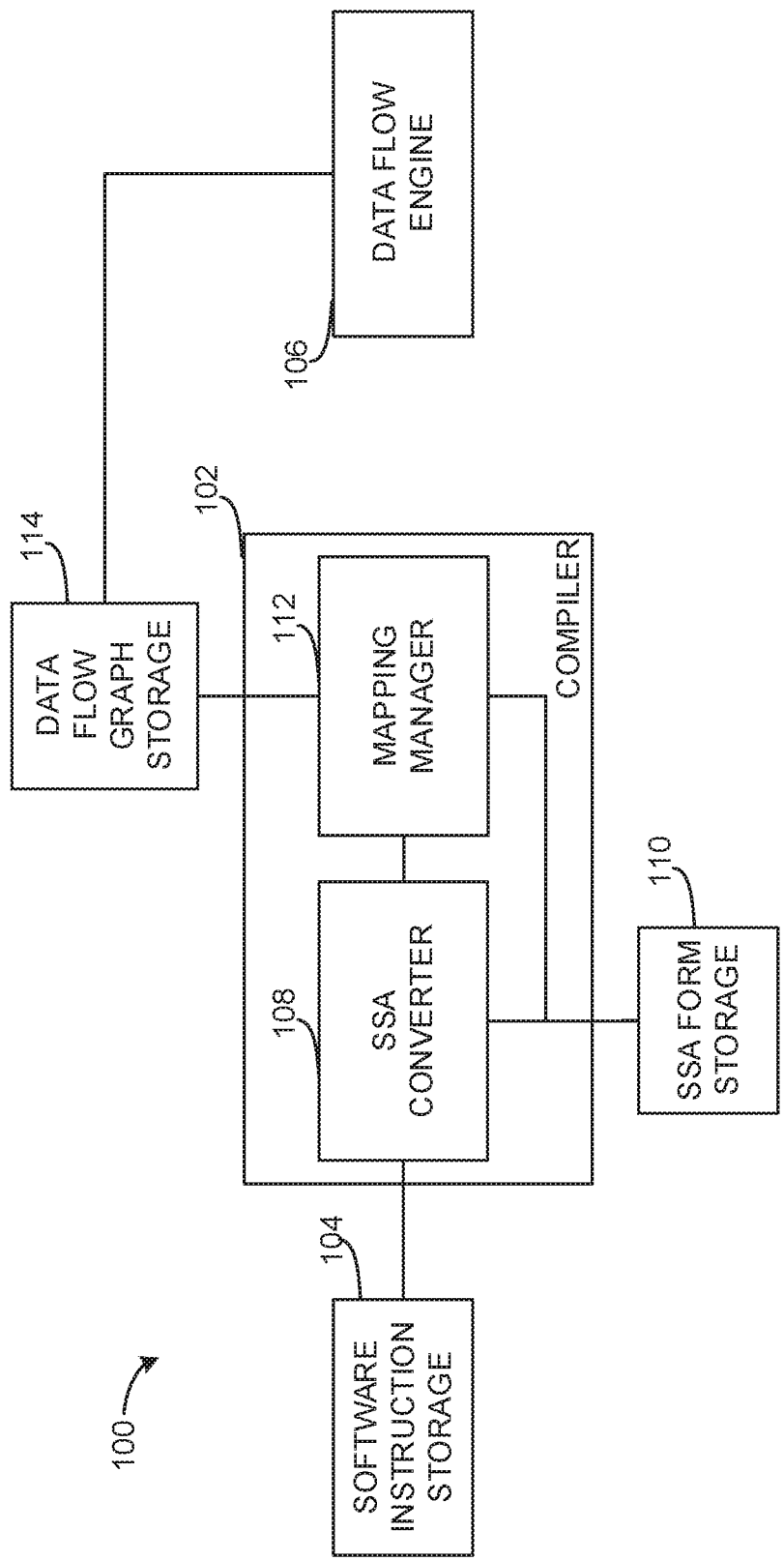
FIG. 1 is a block diagram of an example processing system including an example compiler.

FIG. 1 is a block diagram of an example processing system 100 including an example compiler 102. The compiler 102 compiles a set of software instructions stored in an example software instruction storage 104 for execution by an example data flow engine 106. In some examples, the compiler 102 includes an example static single assignment (SSA) code converter 108. The SSA code converter 108 converts the instructions stored in the software instruction storage 104 to a SSA format and stores the instructions in the SSA format in an example SSA storage 110. An example mapping manager 112 maps the SSA formatted instructions to a data flow graph. In some examples the mapping manager 112 stores the data flow graph in an example data flow graph storage 114 and/or supplies the data flow graph to the data flow engine 106 for execution.

Figure 2:
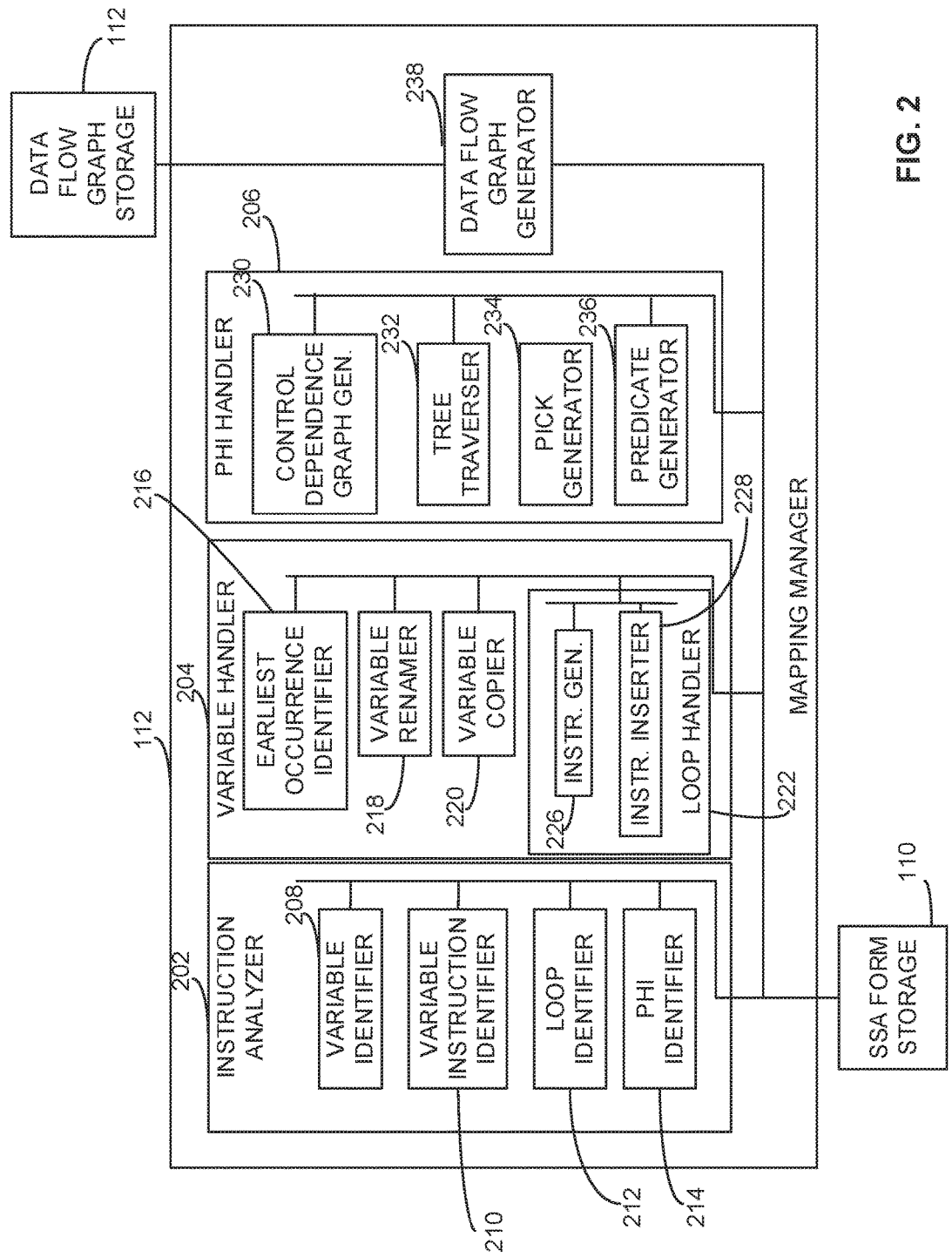
FIG. 2 is a block diagram of an example implementation of an example mapping manager of the example compiler of FIG. 1.

FIG. 2 is a block diagram of an example implementation of the example mapping manager 112 of FIG. 1. In some examples, the mapping manager 112 includes an example instruction analyzer 202, an example variable handler 204, and an example PHI handler 206. In some examples, the example instruction analyzer 202 includes an example variable identifier 208, an example variable instruction identifier 210, an example loop identifier 212 and an example PHI identifier 214. The instruction analyzer 202 examines the SSA formatted instructions stored in the SSA code storage 110 to identify: 1) first information to be used by the variable handler 204, and 2) second information to be used by the PHI handler 206.

The example variable handler 204 includes an example earliest occurrence identifier 216, an example variable renamer 218, an example variable copier 220, and an example loop handler 222. The example loop handler 222 includes an example instruction generator 226 and an example instruction inserter 228. As described in greater detail below, the variable handler 204 uses the first information to ensure that variables in the code are each only used a single time and to further ensure that a value is generated for a loop variable, during each iteration of the loop. The PHI handler 206 uses the second information to map the PHI instruction to nodes/functions of a data flow graph.

The PHI handler 206 includes an example control dependence graph generator 230, an example tree traverser 232, an example pick generator 234, and an example predicate generator 236.

Referring still to FIG. 2, static single assignment (SSA) formatting requires that each variable included in a set of software instructions is defined only one time. This requirement is known as the "single definition" property. A variable eventually ends up being a channel in the data flow graph to be created by the mapping manager 112 and each use of the variable in the instructions will represent a separate consume channel in the data flow graph. As a result, the data flow graph also requires the property called "single usage" in addition to the "single definition" property. As such, an example software program having the following set of three instructions: 1) x=a+b; 2) y=x+c; and 3) z=x+d does not satisfy the single usage property because the variable "x" is used three times (e.g., the variable "x" appears in each of the three instructions). Thus, the mapping manager 112 modifies the instructions so that multiple uses of the variable "x" are eliminated. Likewise, any variable used in a loop, but that is defined outside of that loop is explicitly repeated by the instructions (e.g., the instructions generate, for each loop iteration, a value for the variable) so that the instructions can successfully be used to generate a data flow graph.

Referring still to FIG. 2, the example variable identifier 208 of the example instruction analyzer 202 analyzes the software instructions stored in the SSA code storage 104 to identify variables in the software instructions that are used multiple times. By way of example, the variable identifier 208, when analyzing the three instructions: 1) x=a+b; 2) y=x+c; and 3) z=x+d, identifies the variable "x" as being used more than one time. In addition, the example variable instruction identifier 210 identifies the instructions stored in the SSA code storage 104 that use the identified variable (e.g., the variable "x"). Thus, the variable instruction identifier 210, when analyzing the set of three instructions: 1) x=a+b; 2) y=x+c; and 3) z=x+d, identifies all three instructions as instructions that use the variable "x." In some examples, the variable identifier 208 and the variable instruction identifier 210 supplies information identifying the identified variable and the identified instructions to the variable handler 204.

As mentioned above, in some examples, the example variable handler 204 uses first information (e.g., the identified variable and the identified instructions) supplied by the instruction analyzer 202 to ensure that variables in the SSA code are each only used a single time. To achieve that, the example earliest occurrence identifier 218 identifies the earliest (first to be executed) instruction of the set of identified instructions that contain the variable. In the example set of three instructions, the earliest occurring instruction is the first instruction (e.g., x=a+b). In addition, the example variable renamer 218 renames the variable "x" occurring in the identified instructions supplied by the example variable instruction identifier 210 except for the earliest occurring identified instruction. As applied to the three example instructions, the variable renamer 218 leaves the first instruction alone (e.g., does not rename the identified variable), renames the variable "x" in the second instruction to the variable "x1" and renames the variable "x" in the third instruction "x2." After the renaming operation, the example three instructions take the form: 1) x=a+b; 2) y=x1+c; and 3) z=x2+d.

In addition, the example variable copier 220 of the example variable handler 204 causes the value of the identified variable that is generated in the earliest occurring instruction to be copied to later-occurring instructions that use the variable "x." In some examples, the variable copier 220 causes the value of the identified variable generated in the earliest occurring instruction to be copied to later-occurring instructions by inserting a "copy instruction" after the earliest occurring instruction and before the later occurring instructions. In some examples, a "copy instruction" includes two or more arguments. A first argument represents a source of the value to be copied and the one or more other arguments represent a destination to which the value is to be copied. As applied to the three example instructions, the variable copier 220 inserts an instruction "copy x, x1, x2" to cause a value of the variable "x" to be copied to, and used as, the values for a variable "x1" and a variable "x2." As a result of the copy instruction, the value of the variable "x" is used as the value of the variables "x1," and "x2." Thus, the value of the identified variable that is generated in the earliest occurring instruction is copied to later-occurring instructions that use the renamed variables "x1," and "x2."

After the example variable copier 220 copies the value of the variable "x" to the renamed versions of the variable "x" (e.g., to the variables "x1," and "x2), the example loop handler 222 operates to modify the SSA instructions. In some examples, the loop handler 222 includes an example instruction generator 226 and an example instruction inserter 228. The modifications performed by the example loop handler 222 cause the values corresponding to variables that are used inside a loop. but defined outside the loop to be repeatedly generated for each loop iteration. The values for such variables are to be repeatedly generated because, once the value corresponding to a loop iteration is generated and consumed by hardware, another value is to be generated for consumption during the next loop iteration (or at the exit of the loop, depending on the way in which the variable operates within the loop).

In some examples, the example loop identifier 212 of the example instruction analyzer 202 examines the SSA instruction and identifies loops that contain variable references. In some examples, the loop identifier 212 also identifies a loop head and a loop latch for each identified loop. The loop identifier 212 supplies information about the identified loops to the instruction generator loop handler 222.

The instruction generator 226 uses the information to generate data flow instructions to be inserted into the identified loops. In some examples, the instruction generator 226 generates a PICK instruction for each of the loops. The PICK instruction, which may be represented as "x=PICK b, x1, x2" is equal to a C code instruction: "x=b? x1: x2." The PICK instruction causes the value of the variable "x" to be sent to "x1" if the value of the variable "b" is false. If the value of the variable "b" is not false, the value of the variable "x" is sent to the variable "x2." The instruction inserter 222 inserts the PICK instruction at the loop head and causes the value of the variable "x" to be picked from outside the loop (in the case of the first iteration) or picked from a value generated by the loop body.

In some examples, the instruction generator 226 also generates a SWITCH instruction for each of the loops. The SWITCH instruction generated for a loop is placed at the loop latch and, obtains a value for the variable, and based on a loop exit condition, either switches (sends) the value to the loop head for consumption by the newly inserted PICK instruction or ignores the value. In some examples, the SWITCH instruction is represented as "x1, x2=SWITCH b, x."

Figure 3:
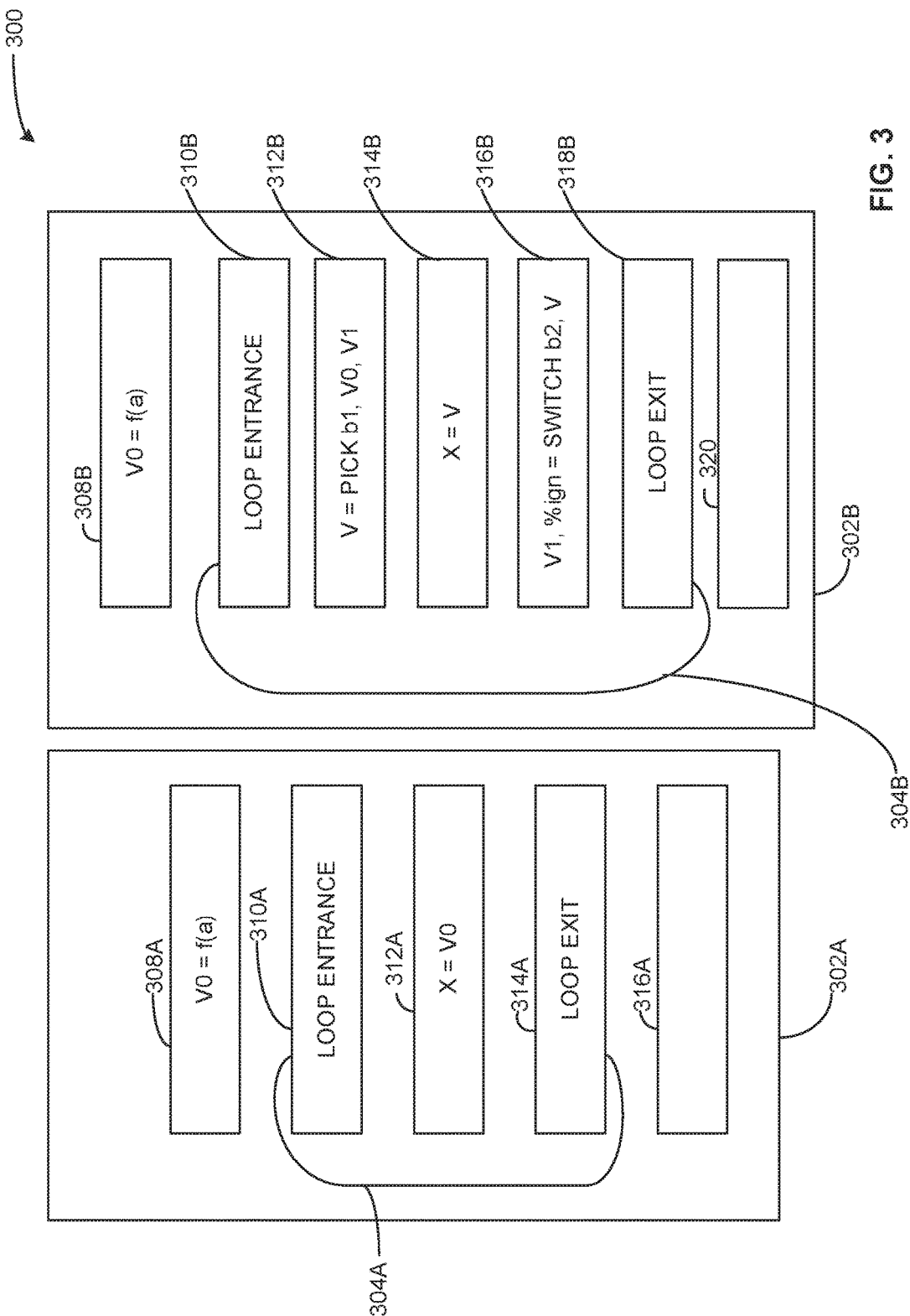
FIG. 3 is a first set of example instructions and a second set of example instructions to be modified by the example loop handler of the example mapping manager of FIG. 2.

FIG. 3 illustrates two example sets of instructions 300 representing a loop that operates on a variable "V0." A first set of instructions 302A includes first (unmodified) loop instructions 304A and the second set of instructions 302B includes second (modified) loop instructions 304B. The first set of instructions 302A includes a first non-loop (outside of the loop) instruction 308A in which the value of "V0" is defined as equal to "f(a)." The first loop instructions 304A include an example first loop instruction 310A corresponding to the loop entrance, an example second loop instruction 312A at which the variable "X" is defined as being equal to the value of "V0," and an example third loop instruction 314A corresponding to the loop exit. An example second non-loop instruction 316A follows the exit of the first loop instructions 304A.

The second set of instructions 302B are a version of the first set of instructions 302A that have been modified by the loop handler 222. The second set of instructions 302B includes a first non-loop (outside of the loop) instruction 308B in which the value of "V0" is defined as equal to "f(a)." The second loop instructions 304B include an example first loop instruction 310B corresponding to the loop entrance, an example second loop instruction 312B that is generated and inserted by the loop handler 222, an example third loop instruction 314B at which the variable "X" is defined as being equal to the value of "V0," an example fourth loop instruction 316B generated and inserted by the loop handler 222, and an example fifth loop instruction 318B corresponding to the loop exit. An example second non-loop instruction 320B follows the second loop instructions 304B.

The first and second sets of instructions 302A, 302B are used herein to illustrate the results of the operations performed by the example loop handler 222. As shown, the second set of instructions 302B include loop instructions that have been generated and inserted by the loop handler 222. For example, the second loop instruction 312B is a PICK instruction, "V=PICK b1, V0, V1," and the fourth loop instruction 316B is a SWITCH instruction, "V1, % ign=SWITCH b2, V." As described above, the PICK instruction causes the value of "V" generated outside of the loop to be used in the first loop iteration and causes the value of "V" generated within the loop body to be used for later iterations. While the SWITCH instruction causes the value for the variable "V1" to be defined as the value for the variable "V" at the start of the next loop iteration.

Referring again to FIG. 3, in addition to the example variable handler 204 operating on the SSA code, the example PHI handler 206 also operates on the SSA code. In some examples, the PHI handler 206 is configured to replace all PHI instructions included in the SSA code. PHI instructions are used in SSA formatted code when more than one variable definition reaches a single node. In such circumstances, the value to be assigned to the variable at that node depends on the flow control of the coded instructions dictated by, for example, branching instructions that lead up to the node. An example PHI instruction can take the form, "x=PHI (x3, B3, x4, B4, x5, B5, x6, B6)." In the example PHI instruction, the variable "x3" refers to the value assigned to the variable "x3" at the PHI input block B3, the variable "x4" refers to the value assigned to the variable "x4" at the PHI input block B4, the variable "x5" refers to the value assigned to the variable "x5" at the PHI input block B5 and the variable "x6" refers to the value assigned to the variable "x6" at the PHI input block B6. Thus, based on the PHI instruction, "x" can be assigned any of the values of "x3," "x4," "x5," and "x6," depending on which of the PHI inputs blocks lead to the PHI instruction.

Figure 4:
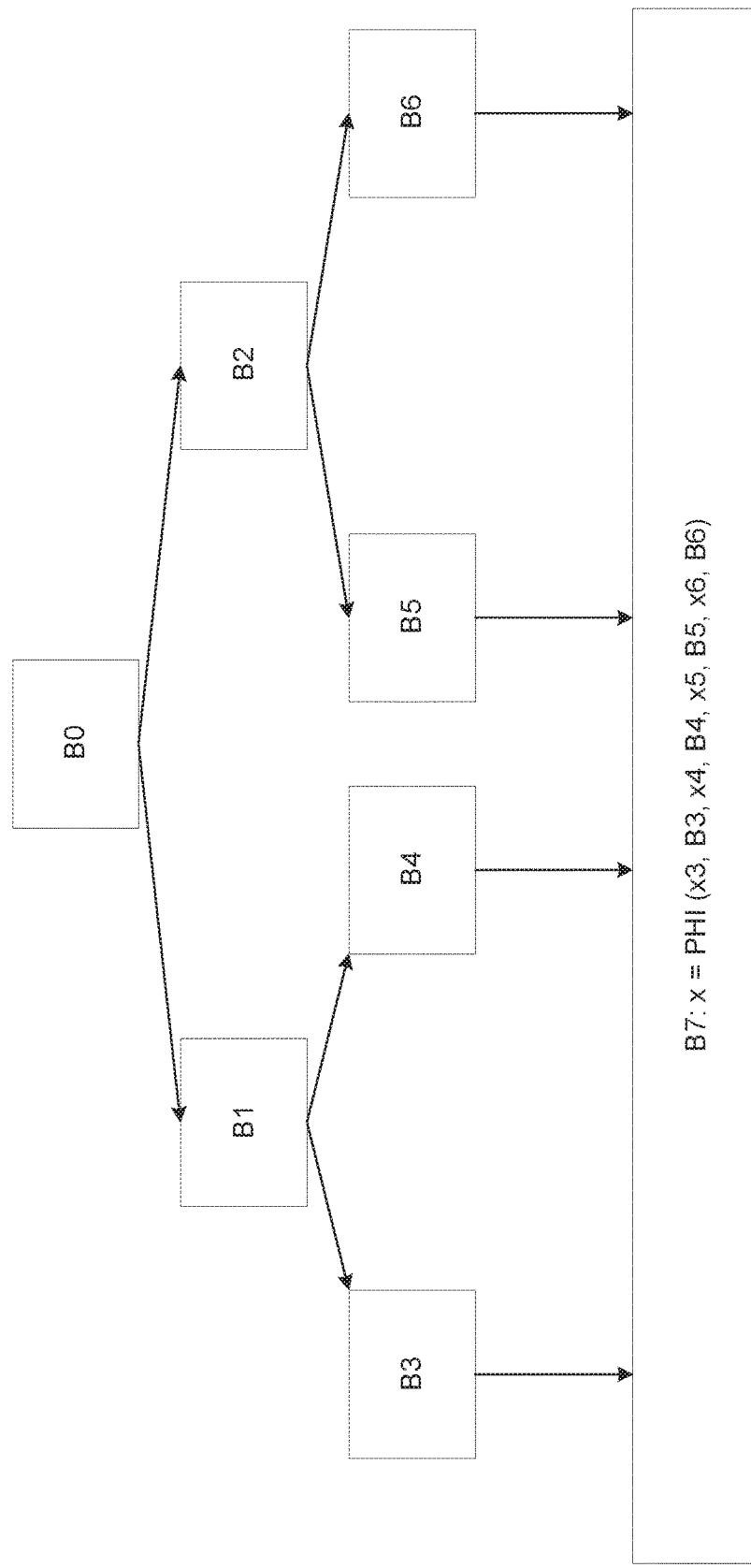
FIG. 4 is an example control dependence graph containing a complete control dependence tree.

Referring also to FIG. 4, an example control dependence graph 400 illustrates a control dependence tree that represents SSA instructions that include the PHI instruction. The control dependence graph 400 includes an example node B0, an example node B1, an example node B2, an example node B3, an example node B4, an example node B5, an example node B6 and an example node B7. As illustrated, the node B0 results in a branch to either node B1 or node B2, the node B1 results in a branch to either node B3 or node B4, the node B2 results in a branch to either the node B5 or the node B6, and the node B7 assigns a value to a variable "x" based on any of the nodes B3, B4, B5, or B6. Thus, the node executed before the node B7 (which can include any of the nodes B3, B4, B5 and B6) will dictate the value to be assigned to the variable "x" at the node B7. Conventional methods to convert SSA code to a data flow graph for execution by a data flow engine do not include any way to lower a PHI node directly onto a data flow graph. Instead, conventional methods require transforming the SSA code out of the SSA format to eliminate the PHI nodes before the instructions can be mapped to a data flow graph. In contrast, the PHI handler 206 of the mapping manager 112 of FIG. 2 handles the PHI instructions included in SSA formatted code in a manner that allows the PHI nodes to be lowered directly onto the data flow graph.

In some examples, the example PHI handler 26 maps PHI instructions in the SSA code to a data flow graph by mapping the PHI instruction to a tree of PICK instructions. In some such examples, the example PHI identifier 214 of the example instruction analyzer 202 analyzes the SSA code to identify all instances of PHI instructions included in the SSA code. When a PHI instruction is identified, the PHI identifier 214 provides information about the PHI instruction to the example control dependence graph generator 230. The control dependence graph generator 230 uses the information from the PHI identifier 214 as well as the SSA code to generate a control dependence graph corresponding to the PHI node. The control dependence graph illustrates the nodes upon which the PHI node depends for input (see for example, the example control dependence tree 400 of FIG. 4). Next, the example tree traverser 232 traverses the control dependence tree to identify control dependence parents of the PHI node. Provided that the control dependence graph forms a complete tree, the tree traverser 232 begins at a basic input node of the PHI node and traverses up the control dependence tree until the corresponding root node is reached.

In some examples, for each control dependence parent encountered during the traversal to the root node, a PICK instruction will be generated. For example, the tree traverser 232 may begin with the basic input block B3 and then traverse upward to node B1. In the example control dependence graph of FIG. 4, the node B1 is a control dependence parent of the node B3. Upon encountering the node B1, the tree traverser 232 notifies the PICK generator 234 which responds by generating a first PICK instruction. The first PICK instruction uses the branch condition "b1" associated with the node B1 to control which of two values will be assigned to the variable "y1." The two possible operands for the PICK instruction include a value corresponding to the variable "x3" associated with the node B3 or a value of an as yet unknown variable, "?," to be filled in when the tree traverser 232 reaches the node B4 as described below. In such examples, the first PICK instruction is represented as, "y1=PICK b1, x3, ?." As stated, the "?" will be identified as the tree traverser 232 continues to traverse the control dependence graph 400.

For example, the tree traverser 232 next begins at the basic input node B4 and traverses up to the node B1. Upon encountering the control dependence parent B1, the tree traverser 232 notifies the PICK generator 234 which responds by inserting the variable "x4" into the first PICK instruction such that the first PICK instruction becomes "y1=PICK b1, x3, x4." Upon traversing the control dependence tree 400 from the basic input nodes B5 and B6, the tree traverser 232 identifies the control dependence parent B2 and the PICK generator 234 generates a second PICK instruction which, based on a branch condition "b2," picks either of two values corresponding to the inputs "x5" and "x6" associated with the nodes B5 and B6, respectively. The second PICK instruction is represented as "y2=PICK b2, x5, x6." Upon further traversal up the control dependence tree 400, the tree traverser 232 encounters the node B0 and the PICK generator 234 generates a third PICK instruction represented as "x=PICK b0, y1, y2." In addition to generating the PICK instructions, the PICK generator 234 also inserts the PICK instructions as a PICK tree into the SSA code in place of the PHI instruction. As the PICK tree can be lowered directly onto the data flow graph, the resulting code is now able to be lowered directly onto the data flow graph without the SSA code having been transformed out of the SSA format.

In some examples the control dependence graph does not form a complete tree. In some such examples, the example control dependence graph generator 230 notifies the example predicate generator 236 when the control dependence tree is not complete. The predicate generator 236 responds to the notification by generating a predicate for each input node of the PHI instruction that corresponds to the incomplete control dependence tree. The predicate is assigned a value of 0 if the corresponding input node is not executed and the predicate is assigned a value of 1 if the corresponding input node is executed. The predicate generator 236 also adds a hardware instruction to combine all of the generated predicates and to assign a value to the variable of the PHI instruction based on the predicates.

When the example PHI handler 206 has finished operating (e.g., all of the PHI instructions have been handled), the instructions, as modified by the example variable handler 204 and by the PHI handler 206, are supplied to the example data flow graph generator 238. The data flow graph generator 238 uses the modified instructions to generate a data flow graph and causes the data flow graph to be stored in the data flow graph storage 114 for execution by the data flow engine 106. The process of generating the data flow graph is also referred to herein as mapping the modified instructions to a data flow graph and/or lowering the modified instruction onto a data flow graph.

While an example manner of implementing the mapping manager 112 of FIG. 1 is illustrated in FIG. 2, one or more of the elements, processes and/or devices illustrated in FIG. 2 may be combined, divided, re-arranged, omitted, eliminated and/or implemented in any other way. Further, the example instruction analyzer 202, the example variable handler 204, the example PHI handler 206, the example variable identifier 208, the example variable instruction identifier 210, the example loop identifier 212, the example PHI identifier 214, the example earliest occurrence identifier 216, the example variable renamer 218, the example variable copier 220, the example loop handler, the example instruction generator 226, the example instruction inserter 228, the control dependence graph generator 230, the example tree traverser 232, the example PICK generator 234, the example predicate generator 236, the example data flow graph generator 238 and/or, more generally, the example mapping manager 112 of FIG. 1 may be implemented by hardware, software, firmware and/or any combination of hardware, software and/or firmware. Thus, for example, any of the example instruction analyzer 202, the example variable handler 204, the example PHI handler 206, the example variable identifier 208, the example variable instruction identifier 210, the example loop identifier 212, the example PHI identifier 214, the example earliest occurrence identifier 216, the example variable renamer 218, the example variable copier 220, the example loop handler, the example instruction generator 226, the example instruction inserter 228, the control dependence graph generator 230, the example tree traverser 232, the example PICK generator 234, the example predicate generator 236, the example data flow graph generator 238 and/or, more generally, the example mapping manager 112 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example instruction analyzer 202, the example variable handler 204, the example PHI handler 206, the example variable identifier 208, the example variable instruction identifier 210, the example loop identifier 212, the example PHI identifier 214, the example earliest occurrence identifier 216, the example variable renamer 218, the example variable copier 220, the example loop handler, the example instruction generator 226, the example instruction inserter 228, the control dependence graph generator 230, the example tree traverser 232, the example PICK generator 234, the example predicate generator 236, the example data flow graph generator 238, and/or the example mapping manager 112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example mapping manager 112 of FIG. 1 may include one or more elements, processes and/or devices in addition to, or instead of, those illustrated in FIG. 2, and/or may include more than one of any or all of the illustrated elements, processes and devices.

Figure 5:
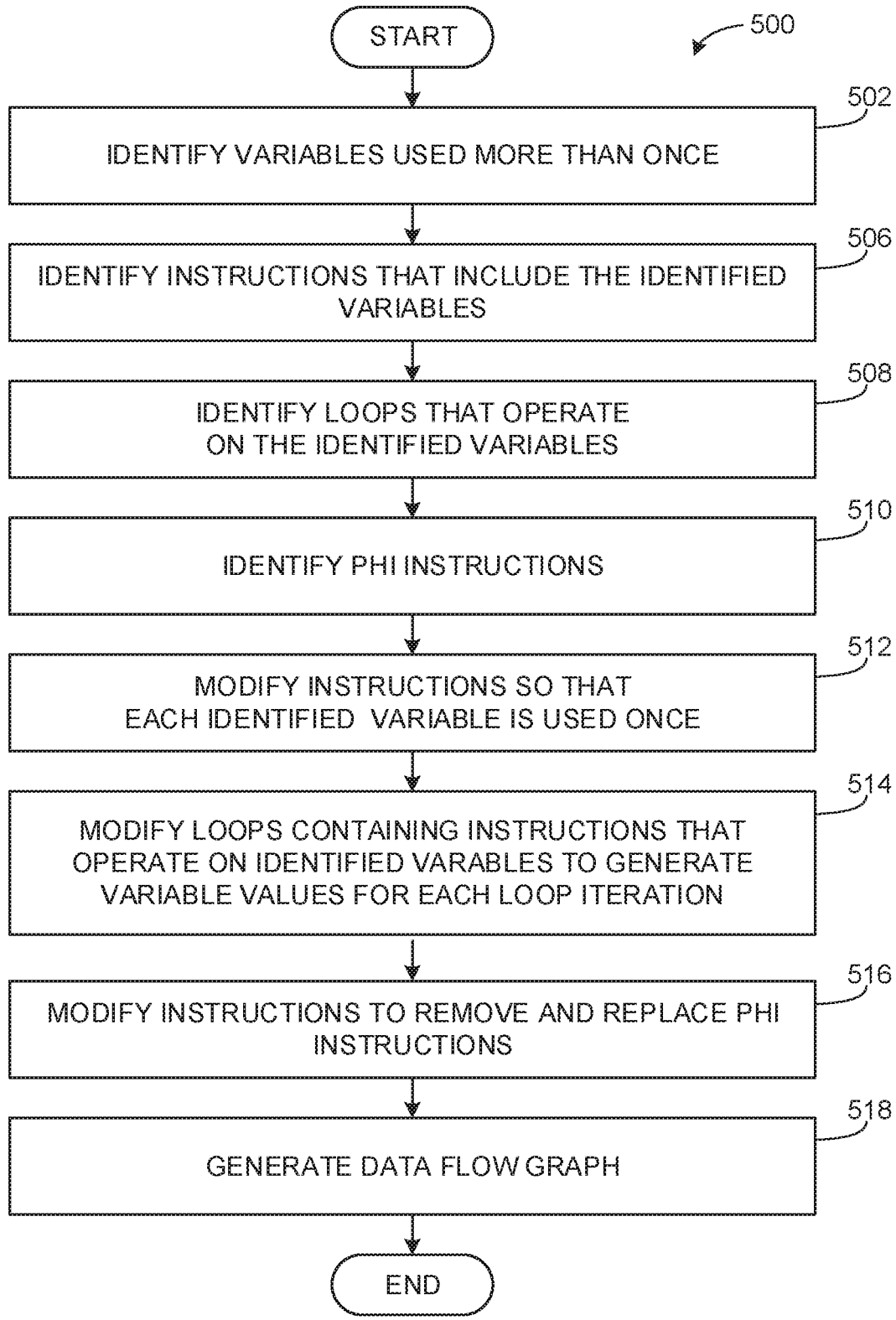
FIG. 5 is a flowchart representative of example machine readable instructions which may be executed to implement the example mapping manager of FIG. 1 and/or FIG. 2.
Figure 6:
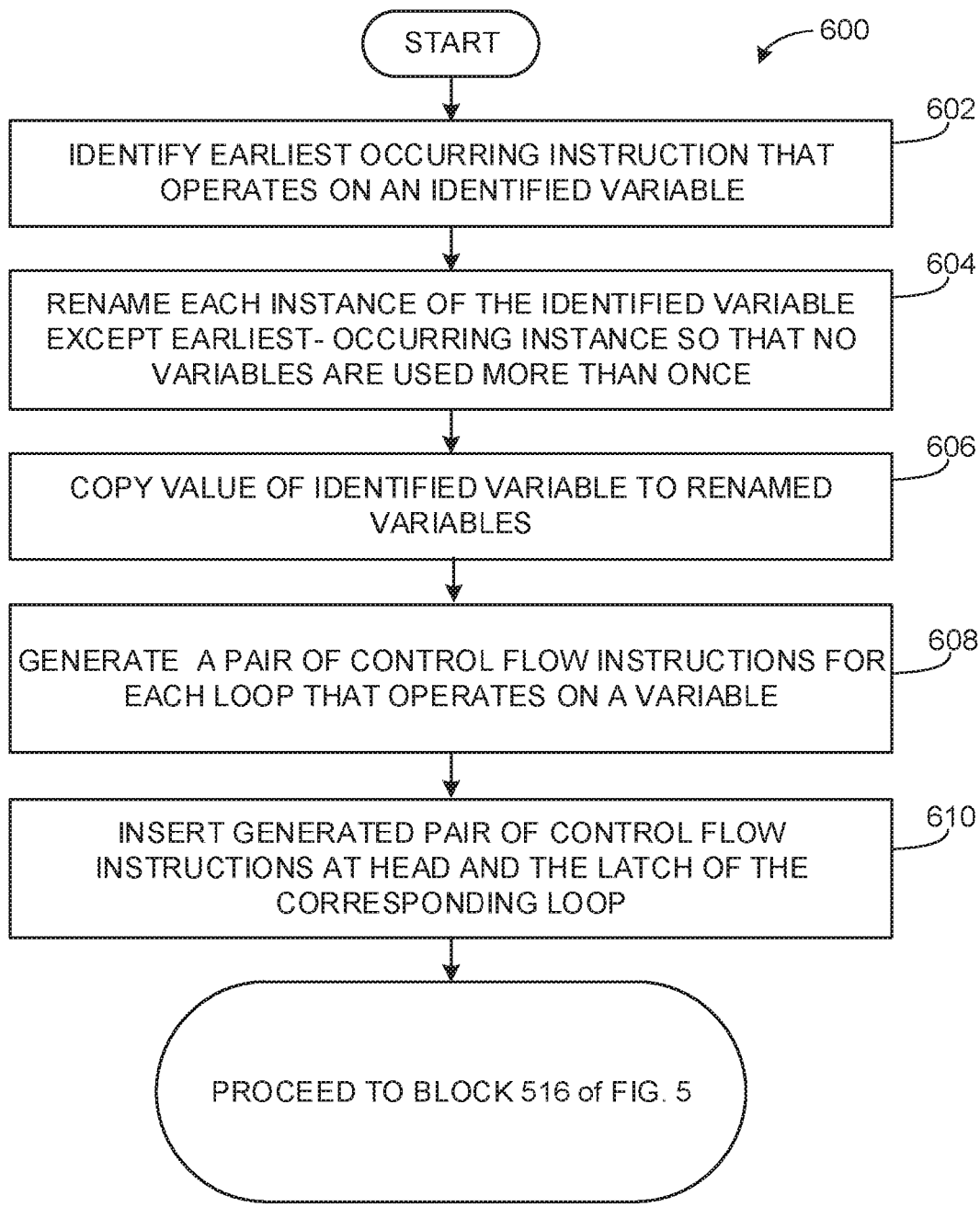
FIG. 6 is a flowchart representative of example machine readable instructions which may be executed to implement the example variable handler of FIG. 2.
Figure 7:
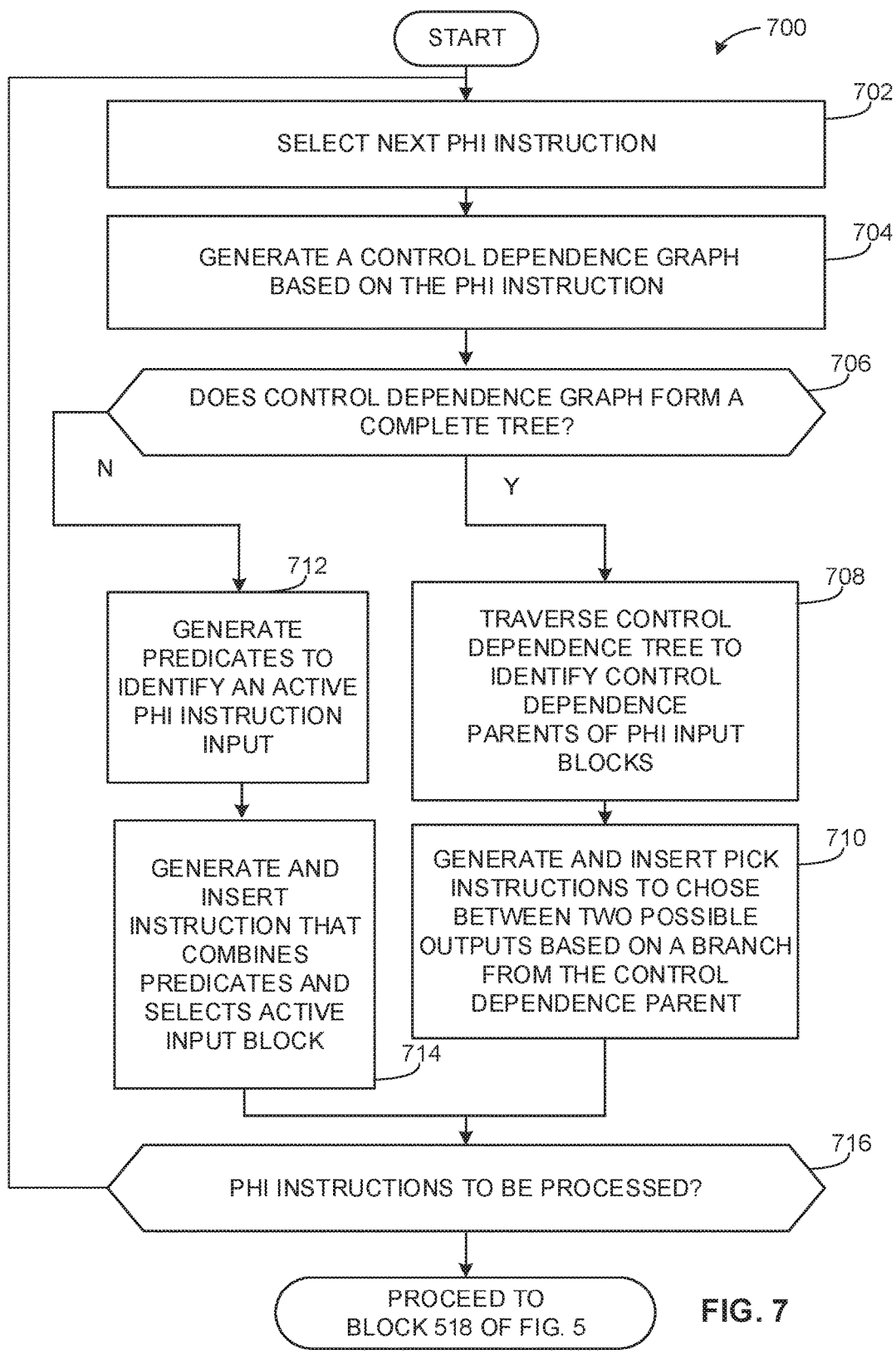
FIG. 7 is a flowchart representative of example machine readable instructions which may be executed to implement the example PHI handler of FIG. 2.

A flowchart representative of example machine readable instructions for implementing the mapping manager 112 of FIGS. 1 and/or 2 is shown in FIGS. 5, 6 and 7. In this example, the machine readable instructions represent a program for execution by a processor such as the processor 812 shown in the example processor platform 800 discussed below in connection with FIG. 8. The program may be embodied in software stored on a non-transitory computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIGS. 5, 6, and 7, many other methods of implementing the example mapping manager 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5, 6 and 7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program 500 of FIG. 5 begins at block 502 at which the example variable identifier 208 (see FIG. 2) of the example instruction analyzer 202 (see FIG. 2) analyzes the SSA-formatted instructions/code stored in the example SSA storage 110 (see FIG. 2) to identify variables that are used in the code more than once. In addition, the example variable instruction identifier 210 (see FIG. 2) identifies the instructions that contain the identified variable (block 504). The example loop identifier 212 (see FIG. 2) of the instruction analyzer 202 identifies loops that operate on a variable (block 508). In some examples, the loop identifier 212 also determines a head of each identified loop and a latch of each identified loop. The example PHI identifier 214 (see FIG. 2) identifies PHI instructions included in the SSA-formatted instructions/code (block 510).

In some examples, the example variable handler 204 uses the information (e.g., the identified variables and the identified instructions containing the variables) collected and supplied by the instruction analyzer 202 to modify the SSA-formatted code so that each of the identified variables is only used a single time (block 512) in the program represented by the instructions. The variable handler 204 also uses the information (the identified loops) collected and supplied by the instruction analyzer to modify the identified loops (block 514). In some examples, the loop modifications are configured so that each time a loop is iterated, a value corresponding to a variable used in the loop is generated. Additionally, the example PHI handler 206 (see FIG. 2) modifies the SSA-formatted code to remove and replace any PHI instructions identified and supplied by the example PHI identifier 214. The resulting instructions/code having the PHI instructions removed and replaced can now be lowered directly onto a data flow graph. The resulting instructions are supplied to the example data graph generator 238 (see FIG. 2) which uses the instructions to generate a data flow graph (e.g., the data flow graph generator 238 lowers the instructions onto a data flow graph) that can be executed by the data flow engine 106 (see FIG. 1). Thereafter, the program 500 ends.

The program 600 of FIG. 6 represents example instructions that can be used to implement one or more of the blocks of FIG. 5. The program 600 begins at block 602 at which the example earliest occurrence identifier 216 (see FIG. 2) of the example variable handler 204 (see FIG. 2) uses the variable(s) identified by the variable identifier and the instructions identified by the variable instruction identifier to identify an earliest-instance in which an identified variable appears in an instruction. In some examples, the earliest-occurrence identifier 216 identifies the earliest-occurring instruction to the example variable renamer 218 (see FIG. 2). The variable renamer 218 then renames all instances of the variable occurring in the code except for the earliest occurring instruction (block 604). The variable renamer 218 repeats this operation for all identified variables and identified instructions. As a result of the renaming operation, each variable is only used a single time. The example variable copier 220 (see FIG. 2), then causes the value of each variable to be copied to each renamed instance of the variable (block 606). In some examples, the value is copied by inserting a copy instruction. The blocks 602, 604 and 606 represent an example way to implement the example block 512 of FIG. 5.

Referring still to FIG. 6, the example loop handler 222 (see FIG. 2) generates a pair of data flow instructions for each loop that operates on a variable (block 608). In some examples, the loop handler receives information from the example loop identifier 212 identifying the loops that operate on a variable. In some examples, the instructions generated by the loop handler include a PICK instruction and a SWITCH instruction. The PICK instruction chooses a value that was generated outside of the loop body for the loop variable during a first loop iteration. For remaining loop iterations, the PICK instruction chooses a value that was generated in the body of the loop. The SWITCH instruction switches (sends) the value generated for the variable during a loop iteration back to the loop head for usage in the next loop iteration. The loop handler 222 causes the PICK instruction to be inserted at the head of the loop and the loop handler 222 causes the SWITCH instruction to be inserted at the loop latch (block 610). In some examples, the variable handler 204 then stops operating. In some examples, when the variable handler 204 stops operating, the PHI handler 206 operates to process PHI instructions included in the code. In some such examples, after the block 608 and the block 610 (which represent an example way to implement the example block 514 of FIG. 5), the program 600 continues at the block example block 516 of the example program 500 of FIG. 5.

The program 700 of FIG. 7 represents an example way of implementing the block 516 of FIG. 5. The program 700 begins at block 702 at which the example control dependence graph generator 230 (see FIG. 2) selects one of the PHI instructions identified by the example PHI identifier 214 (see FIG. 2). The control dependence graph generator 230 uses the PHI instruction and associated portions of the SSA-formatted instructions/code to generate a control dependence graph based on the PHI instruction. When a control dependence tree in the control dependence graph forms a complete tree (determined at block 706), the example tree traverser 232 (see FIG. 2) of the example PHI handler 206 traverses the control dependence tree to identify control dependence parents of PHI input blocks used in the corresponding PHI instruction (block 708). Additionally, the example PICK generator 234 (see FIG. 2) generates a PICK instruction to choose between two PHI input blocks based on a control dependence parent (block 710). The PICK generator 234 generates a PICK instruction for each control dependence parent thereby result in a tree of PICK instructions. The PICK generator 234 causes the tree of PICK instructions to be inserted into the SSA formatted code in place of the corresponding PHI instruction (also at block 710). When there are more PHI instructions to be processed (determined at block 716), the program 700 returns the block 702 and blocks subsequent thereto.

When a control dependence tree in the control dependence graph does not form a complete tree (determined at block 706), the example control dependent graph generator 704 notifies the example predicate generator 236 (see FIG. 2) which responds by generating a set of predicates (block 712). Each of the predicates corresponds to one of the inputs of the corresponding PHI instruction. Further each predicate takes a value of "0" when the corresponding input is not executed/active and takes a value of "1" when the corresponding input is executed. In addition, the predicate generator 236 generates and inserts a hardware instruction that combines the predicates and selects a value to be used as an input for the PHI instruction based on the predicate corresponding to an active (executed) one of the inputs (block 714). If additional PHI instructions remain to be processed, control returns to the block 702. Otherwise, the program 700 proceeds to the Block 518 of the program 500 of FIG. 5.

Figure 8:
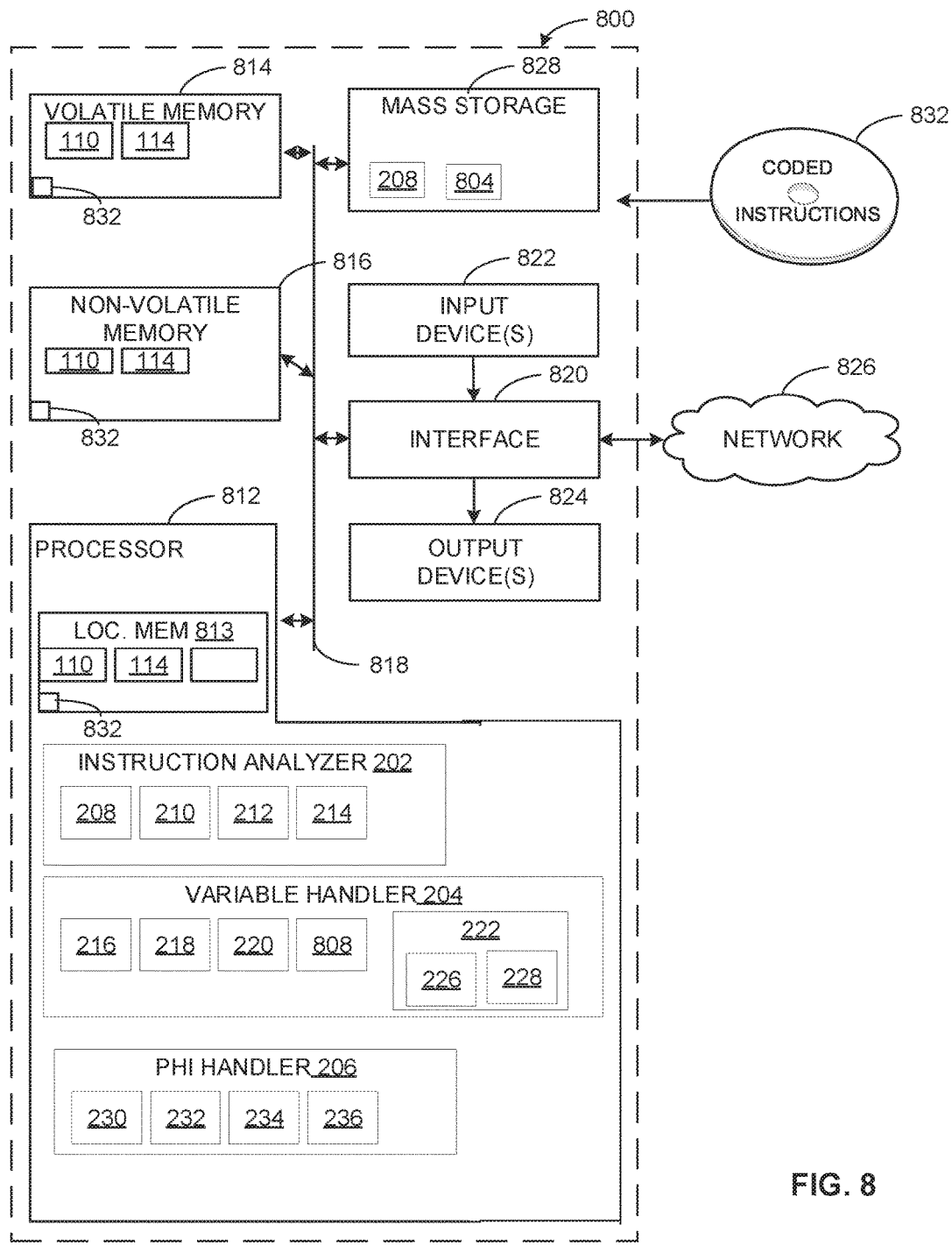
FIG. 8 is a block diagram of an example processing platform structured to execute the instructions of FIGS. 5, 6, and 7 to implement the example mapping manager of FIG. 1 and/or FIG. 2.

FIG. 8 is a block diagram of an example processor platform 8000 structured to execute the instructions of FIGS. 5, 6, and 7 to implement the mapping manger 112 of FIGS. 1 and/or 2. The processor platform 800 can be, for example, a server, a personal computer, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. The hardware processor may be a semiconductor based (e.g., silicon based) device. In this example, the processor 812 implements the example the example instruction analyzer 202, the example variable handler 204, the example PHI handler 206, the example variable identifier 208, the example variable instruction identifier 210, the example loop identifier 212, the example PHI identifier 214, the example earliest occurrence identifier 216, the example variable renamer 218, the example variable copier 220, the example loop handler, the example instruction generator 226, the example instruction inserter 228, the control dependence graph generator 230, the example tree traverser 232, the example PICK generator 234, the example predicate generator 236, the example data flow graph generator 238 and/or, more generally, the example mapping manager 112.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, and/or a printer). The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 5, 6 and 7 may be stored in the mass storage device 828, in the volatile memory 814, in the non-volatile memory 816, and/or on a removable tangible computer readable storage medium such as a CD or DVD.

From the foregoing, it will be appreciated that example methods, apparatus and articles of manufacture have been disclosed that allow a computer program represented in a set of SSA-formatted instructions to be modified and then lowered directly onto a data flow graph without transforming the instructions out of the SSA-format. Known methods to transform instructions out of an SSA format are often fraught with error and, at times, the known transform methods do not work. Thus, eliminating transformation of the instructions out of the SSA format results in greater accuracy, and fewer errors. In addition, because hardware instructions that are fundamental elements of data flow architecture (e.g., the PICK and SWITCH instructions) are used to modify the SSA-formatted instructions, there is no additional cost associated with executing the resulting data flow graph on a data flow engine.

The following further examples are disclosed herein.

Example 1 is an apparatus to map a set of instructions onto a data flow graph for execution by a data flow engine. The apparatus of Example 1 is a variable handler to modify a variable in the set of instructions. The variable is used multiple times in the set of instructions and the set of instructions is in a static single assignment form. The apparatus of Example 1 also includes a PHI handler to replace a PHI instruction contained in the set of instructions with a set of data flow control instructions, and a data flow graph generator to map the set of instructions modified by the variable handler and the PHI handler onto a data flow graph without transforming the instructions out of the static single assignment form.

Example 2 includes the apparatus of Example 1 and further includes an instruction analyzer to analyze the set of instructions by identifying, to the variable handler, the variable that is used multiple times in the set of instructions, and identifying, to the variable handler, a subset of the set of instructions. In Example 2, the subset represents a plurality of instances in which the variable is used.

Example 3 includes the apparatus of claim 2. In Example 3, the variable handler modifies the variable by identifying an earliest-occurring instance of the variable and one or more later-occurring instances of the variable. In addition, the variable handler modifies the variable by replacing the one or more later-occurring instances of the variable with new variables that are unique. The variable handler also modifies the variable by copying the value of the variable resulting from the earliest-occurring instance to the new variables.

Example 4 includes the apparatus of Example 2. In Example 4, the instruction analyzer analyzes the set of instructions by identifying, to the variable handler, that the variable is defined outside of a loop and used in the loop.

Example 5 includes the apparatus of Example 4. In Example 5, the variable handler modifies the variable by inserting data flow control instructions into the set of instructions. The data flow control instructions include a first data flow control instruction that chooses between: 1) a first value for the variable and a second value for the variable generated outside of the loop and 2) a second value for the variable generated inside of the loop. The data flow control instructions also include a second data flow control instruction that, based on a loop exit condition, causes a third value of the variable to be used in a next iteration of the loop.

Example 6 includes the apparatus of any of Examples 1-5. The apparatus of Example 6 further includes an instruction analyzer that analyzes the set of instructions to identify, to the PHI handler, the PHI instruction included in the set of instructions.

Example 7 includes the apparatus of Example 6. In Example 7, the PHI handler replaces the PHI instruction with data flow control instructions by: determining whether a control dependence graph of a set of PHI input blocks forms a complete tree. When the control dependence graph of the set of PHI input blocks forms a complete tree, the apparatus of Example 7 maps the PHI instruction to a tree of the data flow control instructions. The data flow control instructions select respective values to assign to respective variables based on respective branch conditions associated with the PHI input blocks. When the control dependence graph of the set of PHI input blocks does not form a complete tree, the apparatus of Example 7 determines predicates for the respective PHI input blocks and inserts a hardware instruction. The hardware instruction selects a third value to assign to the variable. The third value corresponds to one of the PHI input blocks having a satisfied predicate.

Example 8 includes the apparatus of Example 7. In the apparatus of Example 8, the PHI handler maps the PHI instruction to the tree of data flow control instructions by traversing, from each of the PHI input blocks, up a control dependence tree of the control dependence graph until a root node is reached, and, generating, for each control dependent parent block encountered during the traversal, one of the data flow control instructions.

Example 9 includes the apparatus of Example 8. In the apparatus of Example 9, a first data flow control statement corresponding to a first branch condition associated with a first PHI input selects between a first value corresponding to a first input variable of the PHI instruction and a second value corresponding to a second input variable of the PHI instruction. Further, the first branch condition corresponds to a control dependence parent of a first PHI input block and a second PHI input block.

Example 10 includes one or more non-transitory machine readable storage media comprising instructions which, when executed, cause one or more processors to at least modify a variable in a set of instructions. The variable is used multiple times in the set of instructions. In addition, the set of instructions is in static single assignment form. The instructions further cause the one or more processors to replace a PHI instruction contained in the set of instructions with a set of control data flow control instructions, and generate a data flow graph based on the set of instructions after the variable has been modified and the PHI instruction has been replaced. In Example 10, the data flow graph is executable by a data flow engine.

Example 11 includes the one or more non-transitory machine readable storage media of Example 10. In Example 11, the instructions further cause the one or more processors to identify the variable that is used multiple times in the set of instructions, and identify a subset of the set of instructions. The subset represents a plurality of instances in which the variable is used.

Example 12 includes the one or more non-transitory machine readable storage media of Example 11. In Example 11, the instructions further cause the one or more processors to identify an earliest-occurring instance of the variable, identify later-occurring instances of the variable, and replace the respective, later-occurring instances of the variable with respective new variables. Further, instructions cause the one or more processors to copy the value of the variable resulting from the earliest-occurring instance to the new variables of the later-occurring instances.

Example 13 includes the one or more non-transitory machine readable storage media of Example 12. In Example 13, the instructions further cause the one or more processors to determine that a variable defined outside of a loop is used in the loop.

Example 14 includes the one or more non-transitory machine readable storage media of Example 13. In Example 14, the instructions further cause the one or more processors to insert data flow control instructions into the set of instructions. The data flow control instructions cause respective values to be generated for the variable in respective iterations of the loop.

Example 15 includes the one or more non-transitory machine readable storage media of Example 13. In Example 14, the instructions further cause the one or more processors to insert a first data flow control instruction into the set of instructions. the first data flow control instruction chooses between a first value to be used for the variable and a second value to be used for the variable. The first value is generated outside of the loop and the second value is generated inside of the loop. The instructions further cause the one or more processors to insert a second data flow control instruction. The second data flow control instruction, based on a loop exit condition, causes a third value to be used for the variable in a next iteration of the loop.

Example 16 includes the one or more non-transitory machine readable storage media of any of Examples 10-15. In Example 16, the instructions cause the one or more processors to replace the PHI instructions by determining whether a control dependence graph of a set of PHI input blocks forms a complete tree, and, when the control dependence graph of the set of PHI input blocks forms a complete tree, mapping the PHI instruction to a tree of data flow control instructions. In Example 16, the data flow control instructions select respective values to assign to respective variables based on respective branch conditions associated with the PHI input blocks. The instructions further cause the one or more processors to replace the PHI instructions by, when the control dependence graph of the set of PHI input blocks does not form a complete tree, determining predicates for the respective PHI input blocks and inserting a hardware instruction. The hardware instruction selects a third value to assign to the variable. The third value corresponds to the one of the PHI input blocks having a satisfied predicate.

Example 17 includes the one or more non-transitory machine readable storage media of Example 16. In Example 16, the instructions cause the one or more processors to map the PHI instruction to a tree of data flow control instructions by traversing, from each of the PHI input blocks, up a control dependence tree of the control dependence graph until a root node is reached, and, for each control dependent parent block encountered during the traversal, generating one of the data flow control instructions.

Example 18 includes the one or more non-transitory machine readable storage media of Example 16. In Example 18, a first data flow control statement of the tree of data flow control instructions corresponding to a first branch condition associated with a first PHI input selects between a first value corresponding to a first input variable of the PHI instruction and a second value corresponding to a second input variable of the PHI instruction. The first branch condition corresponds to a control dependence parent of a first PHI input block and a second PHI input block.

Example 19 is a method to generate a data flow graph for execution on a data flow engine. The method of Example 19 includes modifying, by executing an instruction with at least one processor, a variable in a set of instructions. The variable is used multiple times in the set of instructions. The set of instructions is in static single assignment form. The method also includes replacing, by executing an instruction with the least one processor, a PHI instruction contained in the set of instructions with a set of data flow control instructions, and generating, by executing an instruction with the at least one processor, the data flow graph based on the set of instructions after the variable has been modified and the PHI instruction has been replaced.

Example 20 includes the method of Example 19 and further includes identifying the variable in the set of instructions, and identifying a subset of the set of instructions. The subset represents a plurality of instances in which the variable is used.

Example 21 includes the method of Example 20. In Example 21, modifying the variable includes identifying an earliest-occurring instance of the variable and one or more later-occurring instances of the variable, replacing the one or more later-occurring instances of the variable with new variables that are unique, and copying the value of the variable resulting from the earliest-occurring instance to the new variables.

Example 22 includes the method of Example 21. Example 22 further includes determining that the variable is defined outside of a loop and used in the loop, and inserting data flow control instructions into the set of instructions. The data flow control instructions cause respective values to be generated for the variable in respective iterations of the loop.

Example 23 includes the method of Example 22. The method of Example 23 further includes inserting a first data flow control instruction into the set of instructions. The first data flow control instruction chooses between a first value to be used for the variable and a second value to be used for the variable. The first value is generated outside of the loop and the second value is generated inside of the loop. The method of Example 23 also includes inserting a second data flow control instruction that, based on a loop exit condition, causes a third value to be used for the variable in a next iteration of the loop.

Example 24 includes the method of any of Examples 19-23. In the method of Example 24, replacing the PHI instruction includes determining whether a control dependence graph of a set of PHI input blocks forms a complete tree, and mapping the PHI instruction to a tree of data flow control instructions when the control dependence graph of the set of PHI input blocks forms a complete tree. The data flow control instructions select respective values to assign to respective variables based on respective branch conditions associated with the PHI input blocks. In the method of Example 24, replacing the PHI instruction further includes, when the control dependence graph of the set of PHI input blocks does not form a complete tree, determining predicates for the respective PHI input blocks, and inserting a hardware instruction, the hardware instruction to select a third value to assign to the variable. The third value corresponds to one of the PHI input blocks having a satisfied predicate.

Example 25 includes the method of Example 24. In the method of Example 25, mapping the PHI instruction to the tree of data flow control instructions includes traversing, from each of the PHI input blocks, a control dependence tree of the control dependence graph until a root node is reached, and generating, for each control dependent parent block encountered during the traversal, one of the data flow control instructions included in the tree of data flow control instructions.

Example 26 includes the method of Example 25. In the method of Example 26, a first data flow control instruction of the tree of data flow control instructions corresponding to a first branch condition associated with a first PHI input selects between a first value corresponding to a first input variable of the PHI instruction and a second value corresponding to a second input variable of the PHI instruction. In Example 26, the first branch condition corresponds to a control dependence parent of a first PHI input block and a second PHI input block.

Example 27 is an apparatus including comprising means to perform a method as claimed in any of Examples 19-26.

Example 28 is a machine-readable storage including machine-readable instructions. The instructions, when executed, implement a method or realize an apparatus as described in the any of the preceding examples.

Example 29 is an apparatus to map a set of instructions onto a data flow graph for execution by a data flow engine. The apparatus of Example 29 includes means to modify a variable in the set of instructions. The variable is used multiple times in the set of instructions and the set of instructions is in static single assignment form. The apparatus of Example 29 also includes means to replace a PHI instruction contained in the set of instructions with a set of data flow control instructions, and means to map the set of instructions modified by the variable handler and the PHI handler onto a data flow graph without transforming the instructions out of the static single assignment form.

Example 30 includes the apparatus of Example 29 and further includes means to analyze the set of instructions by identifying the variable that is used multiple times in the set of instructions, and by identifying a subset of the set of instructions. The subset represents a plurality of instances in which the variable is used.

Example 31 includes the apparatus of Example 30. In Example 31, the means to modify the variable identifies an earliest-occurring instance of the variable and one or more later-occurring instances of the variable, and replaces the one or more later-occurring instances of the variable with new variables that are unique. In addition, the means to modify the variable copy the value of the variable resulting from the earliest-occurring instance to the new variables.

Example 32 includes the apparatus of Example 30. In Example 32, the means to analyze the set of instructions analyzes the set of instructions by identifying that the variable is defined outside of a loop and used in the loop.

Example 33 includes the apparatus of Example 32. In Example 33, the means to modify the variable inserts data flow control instructions into the set of instructions and the data flow control instructions include a first data flow control instruction that chooses between 1) a first value for the variable and a second value for the variable generated outside of the loop, and 2) a second value for the variable generated inside of the loop. In addition, the data flow control instructions includes a second data flow control instruction that, based on a loop exit condition, causes a third value of the variable to be used in a next iteration of the loop.

Example 34 includes the apparatus of any of Examples 29-33 and also includes means to analyze the set of instructions to identify the PHI instruction included in the set of instructions.

Example 35 includes the apparatus of Example 34. In Example 35, the PHI handler replaces the PHI instruction with data flow control instructions by determining whether a control dependence graph of a set of PHI input blocks forms a complete tree, and, when the control dependence graph of the set of PHI input blocks forms a complete tree, mapping the PHI instruction to a tree of the data flow control instructions. The data flow control instructions select respective values to assign to respective variables based on respective branch conditions associated with the PHI input blocks. The PHI handler also replaces the PHI instruction with data flow control instructions by, when the control dependence graph of the set of PHI input blocks does not form a complete tree, determining predicates for the respective PHI input blocks and inserting a hardware instruction. The hardware instruction selects a third value to assign to the variable. The third value corresponds to the one of the PHI input blocks having a satisfied predicate.

Example 36 includes the apparatus of Example 35. In Example 36, the PHI handler maps the PHI instruction to the tree of data flow control instructions by traversing, from each of the PHI input blocks, up a control dependence tree of the control dependence graph until a root node is reached, and, for each control dependent parent block encountered during the traversal, generating one of the data flow control instructions.

Example 37 includes the apparatus of Example 36. In Example 37, a first data flow control statement corresponding to a first branch condition associated with a first PHI input selects between a first value corresponding to a first input variable of the PHI instruction and a second value corresponding to a second input variable of the PHI instruction. In addition, the first branch condition corresponds to a control dependence parent of a first PHI input block and a second PHI input block.

Example 38 is a machine readable medium including code, when executed, to cause a machine to perform the method of any one of Examples 19-26.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to generate a data flow graph for execution by a data flow engine, the apparatus comprising:
   a variable handler to modify a variable in a first set of instructions in static single assignment (SSA) form to create a second set of instructions in the SSA form;
   a PHI handler to replace a PHI instruction in the second set of instructions with one or more PICK instructions to create a third set of instructions in the SSA form, the one or more PICK instructions based on a control dependence graph of the PHI instruction; and
   a data flow graph generator to map the third set of instructions in the SSA form onto a data flow graph to be executed by the data flow engine, at least one of the variable handler, the PHI handler, and the data flow graph generator is a physical hardware device.

2. The apparatus of claim 1, further including:
   an instruction analyzer to analyze the first set of instructions by:
      identifying, to the variable handler, the variable in the first set of instructions; and
      identifying, to the variable handler, a subset of the first set of instructions, the subset representing a plurality of instances in which the variable is used.

3. The apparatus of claim 2, wherein the variable handler is to modify the variable by:
   identifying an earliest-occurring instance of the variable and one or more later-occurring instances of the variable;
   replacing the one or more later-occurring instances of the variable with new variables, the new variables to be unique; and
   copying a value of the variable resulting from the earliest-occurring instance to the new variables.

4. The apparatus of claim 2, wherein the instruction analyzer is to analyze the first set of instructions by identifying, to the variable handler, that the variable is defined outside of a loop and used in the loop.

5. The apparatus of claim 4, wherein the variable handler is to modify the variable by inserting data flow control instructions into the first set of instructions, the data flow control instructions to include:
   a first data flow control instruction, the first data flow control instruction to choose between 1) a first value for the variable generated outside of the loop and 2) a second value for the variable generated inside of the loop; and
   a second data flow control instruction, the second data flow control instruction to, based on a loop exit condition, cause a third value of the variable to be used in a next iteration of the loop.

6. The apparatus of claim 1, further including an instruction analyzer to analyze the second set of instructions to identify, to the PHI handler, the PHI instruction included in the second set of instructions.

7. The apparatus of claim 6, wherein the PHI handler is to replace the PHI instruction with the one or more PICK instructions by:
   determining whether the control dependence graph of a set of PHI input blocks forms a complete tree;
   when the control dependence graph of the set of PHI input blocks forms a complete tree, mapping the PHI instruction to a tree of the PICK instructions, the one or more PICK instructions to select respective values to assign to respective variables based on respective branch conditions associated with PHI input blocks included in the set of PHI input blocks; and
   when the control dependence graph of the set of PHI input blocks does not form a complete tree, determining predicates for the respective PHI input blocks and inserting a hardware instruction, the hardware instruction to select a third value to assign to the variable, the third value corresponding to the one of the PHI input blocks having a satisfied predicate.

8. The apparatus of claim 7, wherein the PHI handler is to map the PHI instruction to the tree of PICK instructions by:
   traversing, from each of the PHI input blocks, up a control dependence tree of the control dependence graph until a root node is reached; and
   generating, for each control dependent parent block encountered during the traversal, one of the PICK instructions.

9. The apparatus of claim 8, wherein a first data flow control statement corresponding to a first branch condition associated with a first PHI input is to select between a first value corresponding to a first input variable of the PHI instruction and a second value corresponding to a second input variable of the PHI instruction, and the first branch condition corresponds to a control dependence parent of a first PHI input block and a second PHI input block.

10. One or more non-transitory machine readable storage media comprising executable instructions to generate a data flow graph for execution by a data flow engine, the executable instructions, when executed, to cause one or more processors to at least:
    modify a variable in a first set of instructions in static single assignment (SSA) form to create a second set of instructions in the SSA form;
    replace a PHI instruction in the second set of instructions with one or more PICK instructions to create a third set of instructions in the SSA form, the one or more PICK instructions based on a control dependence graph of the PHI instruction; and
    generate a data flow graph based on the third set of instructions in the SSA form, the data flow graph executable by a data flow engine.

11. The one or more non-transitory machine readable storage media of claim 10, wherein the executable instructions cause the one or more processors to:
    identify the variable in the first set of instructions; and
    identify a subset of the first set of instructions, the subset representing a plurality of instances in which the variable is used.

12. The one or more non-transitory machine readable storage media of claim 11, wherein the executable instructions cause the one or more processors to:
    identify an earliest-occurring instance of the variable;
    identify later-occurring instances of the variable;
    replace the respective, later-occurring instances of the variable with respective new variables; and
    copy a value of the variable resulting from the earliest-occurring instance to the new variables of the later-occurring instances.

13. The one or more non-transitory machine readable storage media of claim 12, wherein the executable instructions cause the one or more processors to:
    determine that a variable defined outside of a loop is used in the loop; and
    insert one or more PICK instructions into the second set of instructions, the one or more PICK instructions to cause respective values to be generated for the variable in respective iterations of the loop.

14. The one or more non-transitory machine readable storage media of claim 12, wherein the executable instructions cause the one or more processors to:
    insert a first PICK instruction into the second set of instructions, the first PICK instruction to choose between a first value to be used for the variable and a second value to be used for the variable, the first value generated outside of a loop and the second value generated inside of the loop; and
    insert a second PICK instruction, the second PICK instruction to, based on a loop exit condition, cause a third value to be used for the variable in a next iteration of the loop.

15. The one or more non-transitory machine readable storage media of claim 10, wherein the executable instructions cause the one or more processors to replace the PHI instruction by:
    determining whether the control dependence graph of a set of PHI input blocks forms a complete tree;
    when the control dependence graph of the set of PHI input blocks forms a complete tree, mapping the PHI instruction to a tree of PICK instructions, the PICK instructions to select respective values to assign to respective variables based on respective branch conditions associated with PHI input blocks included in the set of PHI input blocks; and
    when the control dependence graph of the set of PHI input blocks does not form a complete tree, determining predicates for the respective PHI input blocks and inserting a hardware instruction, the hardware instruction to select a third value to assign to the variable, the third value corresponding to the one of the PHI input blocks having a satisfied predicate.

16. The one or more non-transitory machine readable storage media of claim 15, wherein the executable instructions cause the one or more processors to map the PHI instruction to a tree of PICK instructions by:
    traversing, from each of the PHI input blocks, up a control dependence tree of the control dependence graph until a root node is reached; and
    for each control dependent parent block encountered during the traversal, generating one of the PICK instructions.

17. The one or more non-transitory machine readable storage media of claim 16, wherein a first data flow control statement of the tree of PICK instructions corresponding to a first branch condition associated with a first PHI input is to select between a first value corresponding to a first input variable of the PHI instruction and a second value corresponding to a second input variable of the PHI instruction, the first branch condition corresponding to a control dependence parent of a first PHI input block and a second PHI input block.

18. A method to generate a data flow graph for execution on a data flow engine, the method comprising:

modifying, by executing an executable instruction with at least one processor, a variable used multiple times in a first set of instructions to create a second set of instructions, the first and second sets of instructions in static single assignment (SSA) form;

replacing, by executing an executable instruction with the at least one processor, a PHI instruction in the second set of instructions with one or more PICK instructions to create a third set of instructions in the SSA form, the one or more PICK instructions based on a control dependence graph of the PHI instruction; and generating, by executing an executable instruction with the at least one processor, the data flow graph based on the third set of instructions in the SSA form for execution by the data flow engine.

19. The method of claim 18, further including:
identifying the variable in the first set of instructions; and
identifying a subset of the first set of instructions, the subset representing a plurality of instances in which the variable is used.

20. The method of claim 19, wherein the modifying of the variable includes:
identifying an earliest-occurring instance of the variable and one or more later-occurring instances of the variable;
replacing the one or more later-occurring instances of the variable with new variables, the new variables to be unique; and
copying a value of the variable resulting from the earliest-occurring instance to the new variables.

21. The method of claim 20, further including:
determining that the variable is defined outside of a loop and used in the loop; and
inserting one or more PICK instructions into the second set of instructions, the one or more PICK instructions to cause respective values to be generated for the variable in respective iterations of the loop.

22. The method of claim 21, further including:
inserting a first PICK instruction into the second set of instructions, the first PICK instruction to choose between a first value to be used for the variable and a second value to be used for the variable, the first value generated outside of the loop and the second value generated inside of the loop; and
inserting a second PICK instruction, the second PICK instruction to, based on a loop exit condition, cause a third value to be used for the variable in a next iteration of the loop.

23. The method of claim 18, wherein the replacing of the PHI instruction includes:
determining whether the control dependence graph of a set of PHI input blocks forms a complete tree;
when the control dependence graph of the set of PHI input blocks forms a complete tree, mapping the PHI instruction to a tree of PICK instructions, the PICK instructions to select respective values to assign to respective variables based on respective branch conditions associated with PHI input blocks included in the set of PHI input blocks; and
when the control dependence graph of the set of PHI input blocks does not form a complete tree:
determining predicates for the respective PHI input blocks; and
inserting a hardware instruction, the hardware instruction to select a third value to assign to the variable, the third value corresponding to the one of the PHI input blocks having a satisfied predicate.

24. The method of claim 23, wherein the mapping of the PHI instruction to the tree of PICK instructions includes:
traversing, from each of the PHI input blocks, a control dependence tree of the control dependence graph until a root node is reached; and
generating, for each control dependent parent block encountered during the traversal, one of the PICK instructions included in the tree of PICK instructions.

25. The method of claim 24, wherein a first PICK instruction of the tree of PICK instructions corresponding to a first branch condition associated with a first PHI input selects between a first value corresponding to a first input variable of the PHI instruction and a second value corresponding to a second input variable of the PHI instruction, the first branch condition corresponding to a control dependence parent of a first PHI input block and a second PHI input block.

* * * * *